Patented July 8, 1941

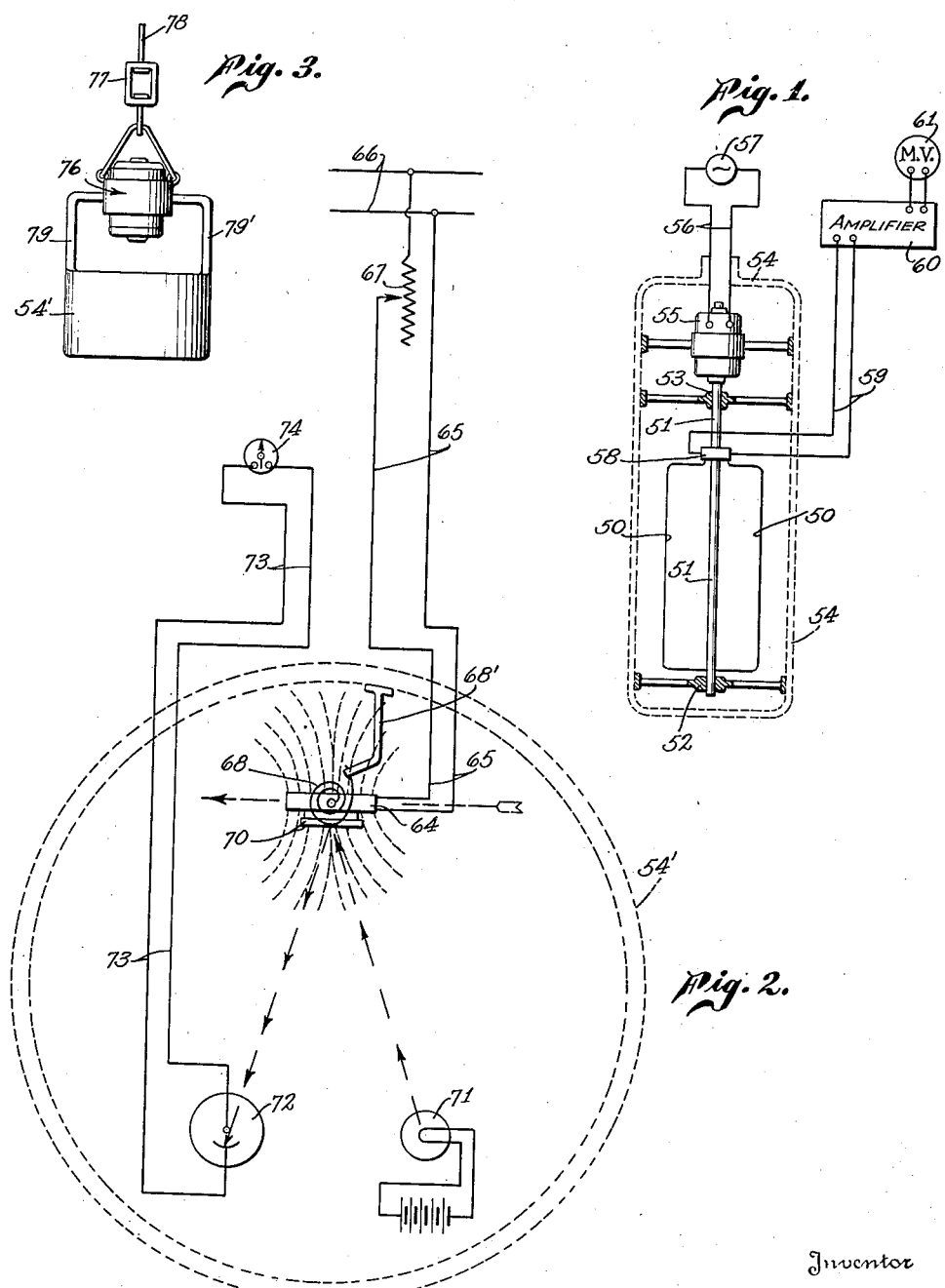

2,248,101

UNITED STATES PATENT OFFICE 2,248,101

METHOD AND APPARATUS FOR INVESTIGATING SUBTERRANEAN STRATA

Ralph W. Lohman, South Pasadena, Calif., assignor, by mesne assignments, to Schlumberger Well Surveying Corporation, Houston, Tex., a corporation of Delaware Original application June 24, 1935, Serial No. 28,074. Divided and this application June 13, 1938, Serial No. 213,349

3 Claims. (Cl. 175—182)

This application is a division of my copending application for a Method and apparatus for investigation subterranean strata by means of electromagnetic measurements, filed June 24, 1935, Serial No. 28,074.

This invention has to do in a general way with the investigation of subterranean formations adjacent a bore hole with a view to determining the character and contents of sub-surface strata after the bore hole has been drilled and without the necessity of taking cores.

The invention relates more specifically to methods of making investigations of the general character above referred to in which electrical measurements and indications are obtained at the surface of the ground, such measurements and indications being obtained by influencing, with magnetic lines of force, an electromagnetic element which is lowered through the bore hole and electrically measuring or indicating the result of such influence at the surface of the ground, thereby obtaining a sensible indication or a graphic record which is indicative of the character and contents of the sub-surface strata through which the element is traveling.

It is a primary object of this invention to produce a method, and an apparatus for practicing the same, whereby the measurements and indications obtained are the result of several unique characteristics of the strata. In pursuit of this object, I have discovered that the capability of an underground formation to transmit magnetic lines of force is an individual function of the character and contents of such formation and I propose to take advantage of this fact in obtaining electrical indications and measurements at the surface of the ground which are commensurate with the magnetic flux-density of any particular strata and are, therefore, a direct indication as to the character and contents of such strata.

The magnetic flux for obtaining such measurements may be that resulting from the earth's magnetic field or it may be an artificially induced flux in which event I am able to obtain a further measurement and indication by comparing an electric current induced through the medium of such flux with the original electric current which is utilized in producing the magnetic field from which the flux was obtained and measured. This latter method, wherein an artificially produced flux is used, is described and claimed in my co-pending application, above referred to, while the present application is concerned chiefly with the utilization of the magnetic flux resulting from the earth's magnetic field.

It is one important feature of the method and apparatus, contemplated by this invention, that there is no necessity for any elecrical contact with the strata.

The method and apparatus contemplated by this invention may be employed in determining the location of various oil bearing strata throughout the length of a bore hole. As is pointed out above, the method contemplated by this invention is dependent upon several unique characteristics of any strata or series of strata which would be traversed along the path of a bore hole. For example, the measurements and indications obtained in the process contemplated by this invention are affected by the magnetic susceptibility and permeability of the strata and also by the eddy current and hysteresis losses in the magnetic flux passing through the strata.

The details in the method and apparatus contemplated by this invention together with other objects attending its producion will be best understood from the following description of the accompanying drawing which is chosen for illustrative purposes only, and in which—

Fig. 1 is a wiring diagram illustrating the use of the earth's magnetic field as the source of magnetic flux for obtaining measurements.

Fig. 2 is a diagrammatic plan view showing a modified form of the invention which also utilizes the lines of force in the earth's magnetic field for obtaining indications at the surface of the ground.

Fig. 3 is a diagrammatic elevation illustrating one manner in which the arrangement shown in Fig. 2 may be associated with a gyroscope for the purpose of orientation.

Referring to Fig. 1, reference numeral 50 indictates a suitably insulated electrically conductive coil of wire of any required number of turns which is shown as being mounted upon a rotatable shaft 51 supported between bearings 52 and 53 contained in a suitable non-magnetic housing indicated by reference numeral 54. The shaft 51 is associated with means, such as an electric motor 55, whereby it may be constantly revolved at a relatively high and constant speed, such motor being shown as connected through a conductor 56 to a source of power of constant electrical frequency generally indicated by reference numeral 57. This assembly is associated with suitable means for lowering the same down through a bore-hole and during such lowering movement the coil is rotated at a high speed through the earth's magnetic field. As the revolving coil cuts the lines of force in such field electromotive force is generated, such electromotive force being taken from the coil through the medium of a commutator or slip-ring arrangement indicated by reference numeral 58 by means of conductors 59 to the surface of the ground where it is amplified through an amplifier 60 and its magnitude measured by means of a suitable instrument such as the millivolt meter 61 or preferably a potentiometer. Since the flux-density from the earth's magnetic field in any particular strata depends upon the characteristics of such strata, it will be seen that the electromotive force generated will also vary depending upon the particular strata, and as pointed out above, by obtaining electromotive force values in a known formation or known formations, and keeping a record of such values it is possible to determine the physical characteristics of unknown formations.

Fig. 2 illustrates another form of apparatus and procedure which may be employed to determine the flux-density of subterranean formations resulting from the earth's magnetic field. This apparatus and method is based upon the principle that when an electrical coil is rotatably mounted upon a vertical axis and a small current is passed through this coil, the plane of the coil will assume a position parallel to the plane of any magnetic field in which it may be immersed. Such a coil is indicated by reference numeral 64 and is shown as being enclosed in a non-magnetic case or housing 54' which is adapted to be lowered down a bore hole with its axis maintained in a substantially vertical position, or alternatively, if desired, in parallel relation with the axis of the bore hole. Current is supplied the coil 64 by conductors 65 from a source of power 66, the circuit containing the coil 64 being provided with a variable rheostat indicated at 67.

If, with the arrangement just described, a small torque is mechanically applied to the coil, the coil will be rotated so that its plane is offset a few degrees from the plane of the field and some other value of current will be required to reduce the angular displacement again to zero. In the device contemplated by this form of the invention the torque is shown as being applied to this coil by means of a small spiral spring indicated at 68, the outer end of which is adjustably fixed in a rigid support 68'. With the torque applied remaining constant it will also be seen that as the flux-density of the field through which the coil is passed varies, the action of the spring will be effective to rotate the coil toward or away from its position of zero displacement as the flux-density varies from the value for which this instrument was originally set.

It will thus be seen that if means are provided for obtaining an indication as to when the coil is rotated in the manner above referred to and additional means are provided for measuring the amount of current necessary to swing the coil back into parallel relation with the earth's field, that such current will give an accurate indication as to the flux-density in the region which resulted in the angular displacement above referred to. For the purpose of instantly obtaining indications at the surface of the ground of the angular displacement and the movement of the coil, I provide the face of the coil with a mirror indicated at 70 and project a light beam upon such mirror from a source generally indicated at 71. This light beam is reflected from the mirror to a photo-electric cell generally indicated by reference numeral 72 which in turn is connected through conductors 73 to a galvanometer, or other suitable instrument 74 located at the surface of the ground. It will thus be seen that any angular displacement of the coil 64 with respect to the earth's magnetic field resulting from the changes in the flux-density of such field will swing the light beam with respect to the photo-electric cell and give an indication on the galvanometer 74. By varying the rheostat 67 or other suitable instrument to change the current supplied to the coil 64, the coil can be swung to its neutral or original position which will also be indicated on the galvanometer and the amount of current thus applied will be a measurement commensurate with the flux-density of the strata responsible for the magnetic influence which was exerted upon the coil.

The entire unit contained in the case or housing 54' comprising the coil 64, the spring 68, the fixed support 68' and the light and cell 71 and 72 respectively, must be constantly maintained in a predetermined oriented position during the operation of the instrument. This may be accomplished by supporting the instrument from suitable pipes or rods which are associated with means for holding them against rotation as the instrument is lowered into the well. In order to expedite the operation of the instrument, however, I prefer to attach the case 54' to a gyroscopic device of a conventional type which will operate to maintain the case in properly oriented position during its travel through the bore hole. Such an arrangement is diagrammatically illustrated in Fig. 3 where numeral 76 indicates a gyroscope suspended through a swivel connection 77 from a cable 78. The intrument case 54' is shown as being attached to the gyroscope through arms 79—79' but it is to be understood that this construction and arrangement is schematic only.

It is to be understood that while I have herein described and illustrated certain preferred procedures and certain type forms of apparatus which may be employed in the practice of the methods contemplated by this invention, that the invention is not limited to the precise methods and circuits described herein, but includes within its scope whatever changes, modifications, combinations and variations which may fairly come within the spirit of the appended claims.

I claim as my invention:

1. The method of investigating the magnetic flux-density of subterranean formations adjacent a bore hole which includes: lowering a conductive coil into said bore hole upon an axis which is in substantially fixed predetermined relation to the plane of the earth's magnetic field; mechanically applying a substantially constant torque to said coil biasing the plane of the coil away from the plane of the earth's field; applying electric current to said coil so as to react against said mechanically applied torque; and measuring the current required to maintain the plane of said coil in predetermined relation with the plane of the earth's field during variations in the flux-density as the coil passes the different strata.

2. The method of investigating the magnetic flux-density of subterranean formations adjacent a bore hole which includes: lowering a conductive coil into said bore hole; maintaining the axis of said coil in substantially fixed predetermined relation to the plane of the earth's magnetic field; mechanically applying a substantially constant torque to said coil thereby biasing the plane of said coil away from the plane of the earth's magnetic field; applying electric current to said coil so as to react against said mechanically applied torque; and measuring the current required to maintain the plane of said coil in predetermined relation with the plane of the earth's field during variations in the flux-density as the coil passes the different strata.

3. For use as described, a non-magnetic housing; a coil mounted in said housing; means including a source of electromotive force for passing a current through said coil whereby the plane of said coil tends to lie in the plane of the earth's magnetic field; means for applying a torque to said coil so that the plane of the coil is offset from the plane of the earth's magnetic field; means for increasing the current passing through said coil; means for measuring the amount of current supplied to said coil; and means for determining the position of said coil.

RALPH W. LOHMAN.